US011898545B2

(12) United States Patent
Pinkerton

(10) Patent No.: US 11,898,545 B2
(45) Date of Patent: Feb. 13, 2024

(54) VENTURI PUMP SYSTEMS AND METHODS TO USE SAME

(71) Applicant: Brane Audio, LLC, Austin, TX (US)

(72) Inventor: Joseph F. Pinkerton, Austin, TX (US)

(73) Assignee: Brane Audio, LLC, Austin, TX (US)

( * ) Notice: Subject to any disclaimer, the term of this patent is extended or adjusted under 35 U.S.C. 154(b) by 508 days.

(21) Appl. No.: 16/908,395

(22) Filed: Jun. 22, 2020

(65) Prior Publication Data

US 2020/0400136 A1 Dec. 24, 2020

Related U.S. Application Data

(60) Provisional application No. 62/865,067, filed on Jun. 21, 2019.

(51) Int. Cl.

| | |
|---|---|
| ***F04B 41/06*** | (2006.01) |
| ***F04F 7/00*** | (2006.01) |
| ***H04R 23/00*** | (2006.01) |
| ***F04B 43/04*** | (2006.01) |
| ***F04B 35/00*** | (2006.01) |
| ***F04B 45/047*** | (2006.01) |

(52) U.S. Cl.

CPC .............. *F04B 41/06* (2013.01); *F04B 35/00* (2013.01); *F04B 43/046* (2013.01); *F04F 7/00* (2013.01); *H04R 23/00* (2013.01); *F04B 45/047* (2013.01)

(58) Field of Classification Search

CPC ......... F04F 7/00; F04B 43/046; F04B 17/003; F04B 41/06; F04B 35/00

See application file for complete search history.

(56) References Cited

U.S. PATENT DOCUMENTS 4,983,876 A * 1/1991 Nakamura ............ F04B 43/046 417/413.2
5,257,914 A * 11/1993 Reynolds ............ F04B 43/0736 417/43
6,071,087 A * 6/2000 Jalink, Jr ................ F04B 17/03 417/322
6,116,517 A * 9/2000 Heinzl ................. B41J 2/14282 417/410.2
6,368,079 B2 * 4/2002 Peters ................... F04B 43/046 417/413.2
8,033,324 B2 * 10/2011 Mukasa .................... F04F 7/00 165/80.3
8,684,707 B2 4/2014 Kanai et al.
9,004,973 B2 4/2015 Condon et al.
9,638,182 B2 5/2017 Pinkerton (Continued)

FOREIGN PATENT DOCUMENTS

KR 2013077855 A * 7/2013 ............ F04B 43/046

OTHER PUBLICATIONS

English Abstract of KR-2013077855-A (Year: 2013).*

(Continued)

*Primary Examiner* — Nathan C Zollinger

(74) *Attorney, Agent, or Firm* — Dickinson Wright PLLC; Ross Spencer Garsson

(57) ABSTRACT

Pumping systems that have pumping system units utilizing venturi pumps. Such pumping systems can be used in speakers, to propel drones, and other applications. Actuation of the venturi pumps can be by piezoelectric actuators, magnetic actuators, electrostatic actuators, and other similar actuators.

28 Claims, 6 Drawing Sheets

(56) References Cited

U.S. PATENT DOCUMENTS

| | | | | |
|---|---|---|---|---|
| 2004/0001767 | A1 * | 1/2004 | Peters | F04B 43/046 417/413.2 |
| 2020/0400136 | A1 | 12/2020 | Pinkerton | |

OTHER PUBLICATIONS

Murata' s "Micromechatronic product" brochure, published at https://doc.platan. Ru/pdf/datasheets/murata/MZB1001T02.pdf, 26 pages.

* cited by examiner

VENTURI PUMP SYSTEMS AND METHODS TO USE SAME

RELATED PATENTS AND PATENT APPLICATIONS

This application claims priority to U.S. Provisional Patent Application Ser. No. 62/865,067, filed Jun. 21, 2019, entitled "Venturi Pump Systems And Methods To Use Same."

This application is also related to U.S. Pat. No. 9,638,182, entitled "Graphene-Trough Pump System," issued May 2, 2017 to Pinkerton (the "Pinkerton '182 Patent"). This patent discloses and teaches pump and engine systems, and methods of making same.

These patents/patent applications are commonly assigned to the Assignee of the present invention and are incorporated herein by reference in their entirety (including Appendices) for all purposes.

TECHNICAL FIELD

The present invention relates to pumping systems, and more particularly, pumping systems that have pumping system units utilizing venturi pumps. Such pumping systems can be used in speakers, to propel drones, and other applications. Actuation of the venturi pumps can be by piezoelectric actuators, magnetic actuators, electrostatic actuators, and other similar actuators.

BACKGROUND

In recent years, the use of piezoelectric actuators have been broadened and adapted to a variety of circumstances and applications. Such applications range from the use in traditional loudspeakers and atomic force microscopes. Applications have also been found for piezoelectric actuation in air pumps. These air pumps are referred to in the art as piezoelectric blowers or microblowers. The microblowers are designed to have a small profile compared to a traditional motor-driven cooling fan. One such microblower is manufactured by Murata Manufacturing Co., Ltd., Kyoto, Japan ("Murata") and measures 10 mm×10 mm and has a height of only 1.3 mm. Murata's "Micromechatronic product" brochure, published at https://doc.platan.ru/pdf/datasheets/murata/MZB1001T02.pdf ("*Murata's Brochure*"), outlines the technology of Murata's microblower. The *Murata Brochure* is incorporated herein in its entirety.

Advantages of microblowers include that they generally consume less power than a comparable motorized fan because the blower has no need to spin fan blade. FIG. 1 (from Murata's Brochure) illustrates a microblower 100. The motor mechanism of microblower 100 is a piezoelectric element 108. The piezoelectric element is actuated by an oscillating voltage that causes piezoelectric element 108 to vibrate rapidly which moves diaphragm 109 and causes a change in the volume of the pumping room/chamber 107.

FIG. 1 shows the sucking in position 101 of the microblower 100 and the ejecting position 102 of the microblower 100. The sucking in position 101 is the vacuum action of the microblower 100 in which the fluid (such as air) is drawn in the venturi nozzle 104 in the top panel 110 and the intake channel 103 (entering from inlet 111) that combine and are drawn into the expanded pumping room 107. The ejecting position 102 is the discharge action of the microblower 100 in which the fluid (such as air) is ejected from the compressed pumping room 107 and combined with the fluid (such as air) from the intake channel 103 and expelled through venturi nozzle 104/outlet 105.

Further explanation and details of such piezoelectric microblower is provided U.S. Pat. No. 8,684,707, entitled "Piezoelectric Microblower," issued Apr. 1, 2014, to Kanai et al. and assigned to Murata, which patent is attached hereto at Appendix B.

Such microblowers are relatively expensive because there is one piezoelectric actuator per pump. Another problem with such microblowers is that the ceramic piezoelectric actuator is mounted on a flexible steel diaphragm and will crack if the diaphragm moves too much. Since the pumping rate of this device increases linearly with diaphragm displacement the maximum pumping rate of this design is compromised by the location of the piezoelectric element. This limitation also increases the cost per unit airflow of this device.

Furthermore, there are additional problems because piezoelectric actuators generate very large forces per unit area of actuator (about 10 million Pa of pressure or about 10,000 times higher than an electrostatic actuator) but can only move about 0.1% of their length (a 5 mm long actuator has a total travel of about 5 microns).

Accordingly, there is a need in the art for a pumping system that overcomes all of these problems.

SUMMARY OF THE INVENTION

The present invention relates to pumping systems that have pumping system units utilizing venturi pumps. Such pumping systems can be used in speakers, to propel drones, and other applications. Actuation of the venturi pumps can be by piezoelectric actuators, magnetic actuators, electrostatic actuators, and other similar actuators.

In general, in one aspect, the invention features a system that includes a venturi pump system. The venturi pump system includes a plurality of venturi pumps. For the venturi pumps in the plurality of venturi pumps, the venturi pump includes a membrane and a venturi nozzle. For the venturi pumps in the plurality of venturi pumps, movement of the membrane is operable to flow fluid by the venturi pump in and out of the venturi nozzle. The venturi pump system further includes one or more lever arms that are operable to move the membranes of the venturi pumps in the plurality pumps. The venturi pump system further includes one or more actuators that are operable to power the venturi pumps in the plurality of venturi pumps by moving the one or more lever arms.

Implementations of the invention can include one or more of the following features:

The one or more actuators can be selected from a group consisting of piezoelectric actuators, magnetic actuators, electrostatic actuators, and combinations thereof.

The one or more actuators can be piezoelectric actuators.

The pumping system can include between 10 to 100 venturi pumps per actuator.

The one or more lever arms can each have a first end. For each of the lever arms, at least one of the one or more actuators can be positioned at or near the first end of the lever arm.

The venturi pumps are located at or near a second end of one or more of the lever arms.

The lever arms can be operable for displacing the membranes of the venturi pumps at least 5 times the displacement of the actuators.

The lever arms can be operable for displacing the membranes of the venturi pumps at least 10 times the displacement of the actuators.

The lever arms can be made of a material selected from a group consisting of steel, aluminum, fiberglass, and combinations thereof.

Each of the venturi pumps in the plurality of venturi pumps can further include a first panel. The first panel can include the venturi nozzle. Each of the venturi pumps in the plurality of venturi pumps can further include a pumping chamber that is bounded in part by the membrane. Each of the venturi pumps in the plurality of venturi pumps can further include an intake channel. The membrane can be moved in a first direction in which, fluid flows from the pumping chamber, the fluid combines with fluid that flows from the intake channel, and the combined fluid flows through the venturi nozzle and out the venturi pump. The membrane can be moved in the second direction in which, fluid flows into the venturi pump through the venturi nozzle, the fluid combines with fluid that flows from the intake channel, and the combined fluid flows into the pumping chamber.

The fluid can be air.

The venturi pumps in the plurality of venturi pumps can further include a displacement object in contact with the membrane and operable to move along the membrane to change the volume of the pumping chamber. The displacement object can be operatively connected to at least one of the one or more lever arms and is operatively moveable by at least one of the one or more lever arms.

The venturi pump system can be operable for pumping at a pumping frequency between 10 kHz and 50 kHz.

The system can include two venturi pump systems that operate at a pumping frequency that are 180 degrees out of phase with one another.

The system can be an audio system that can produce sound at an audio frequency in the range of 20 to 2000 Hz.

The system can include a plurality of venturi pump systems.

The system can be an electric drone.

The system can include 2 to 20 venturi pump systems.

The plurality of venturi pump systems can be operable for controlling and flying the electric drone.

The system can further include solar cells for generating power to operate the venturi pump system.

The system can further include one or more MEMS accelerometers and one or more gyroscopes to control the electric drones to achieve stable flight.

The system can be selected from a group consisting of energy cells, air pump applications, air cooling devices, gas sensors, and combinations thereof.

The system can be selected from a group consisting of fuel cells, microvalves, micropumps, microblowers, air fresheners, toys/games, mobile equipment, micro protectors, security cameras, LED lighting, LED cooling, PC notebooks, piezo fans, reflow checkers, ionizers, and fragrancers.

In general, in another aspect, the invention features a method that includes utilizing a system having a venturi pump system. The venturi pump system includes a plurality of venturi pumps. Each of the venturi pumps includes a membrane and a venturi nozzle. The venturi pump system further includes one or more lever arms. The venturi pump system further includes one or more actuators. The step of utilizing the system includes utilizing the actuators to move the lever arms with the movement by the lever arms moving the membranes of the venturi pumps to flow fluid in and out of the venturi nozzles.

Implementations of the invention can include one or more of the following features:

The one or more actuators can be selected from a group consisting of piezoelectric actuators, magnetic actuators, electrostatic actuators, and combinations thereof.

The one or more actuators can be piezoelectric actuators.

Each of the venturi pumps in the plurality of venturi pumps can further include a first panel, a pumping chamber that is bounded in part by the membrane, and an intake channel. The first panel can include the venturi nozzle. Utilizing the system can include utilizing the actuators to move one or more of the lever arms to move the membrane of the venturi pump in a first direction to flow fluid from the pumping chamber, combines the fluid with fluid that flows from the intake channel, and flows the combined fluid through the venturi nozzle and out the venturi pump. Utilizing the system can include utilizing the actuator to move one or more of the lever arms to move the membrane of the venturi pump in a second direction to flow fluid into the venturi pump through the venturi nozzle, combine the fluid with fluid that flows from the intake channel, and flows the combined fluid into the pumping chamber.

The fluid can be air.

The venturi pumps can be operated at a pumping frequency of 10 kHz and 50 kHz.

The system can include two venturi pump systems. The two venturi pump systems can be operated at a pumping frequency that are 180 degrees out of phase with one another.

In general, in another aspect, the invention features a system that includes a venturi pump system. The venturi pump system includes a plurality of venturi pumps. For the venturi pumps in the plurality of venturi pumps, the venturi pump includes a membrane and a venturi nozzle, and movement of the membrane is operable to flow fluid by the venturi pump in and out of the venturi nozzle. The venturi pump system further includes a piezoelectric actuator. The venturi pump system further includes a mechanical structure that connects the piezoelectric actuator to one or more venturi pumps in the plurality of venturi pumps.

Implementations of the invention can include one or more of the following features:

The venturi pump system can further include one or more additional piezoelectric actuators. For each of the one or more additional piezoelectric actuators, the mechanical structure can connect each of the additional piezoelectric actuators to one or more venturi pumps in the plurality of venturi pumps.

The ratio of (a) the venturi pumps to (b) the piezoelectric actuator and the one or more additional piezoelectric actuators that are connected by the mechanical structure can be at least 4 to 1.

The mechanical structure can connect the piezoelectric actuator to at least five venturi pumps in the plurality of venturi pumps.

The mechanical structure can connect the piezoelectric actuator to at least ten venturi pumps in the plurality of venturi pumps.

The mechanical structure can be a grid structure.

The mechanical structure can be a beam structure.

DETAILED DESCRIPTION

Pumping Systems

The present invention encompasses pumping systems that have pumping system units utilizing venturi pumps. Such venturi pumps have the advantage of having lower costs as compared to the microblowers in the prior art. Such pumping systems of the present invention can be used in speakers, to propel drones, and other applications. Actuation of the venturi pumps can be by piezoelectric actuators, magnetic actuators, electrostatic actuators, and other similar actuators.

Figure 1:
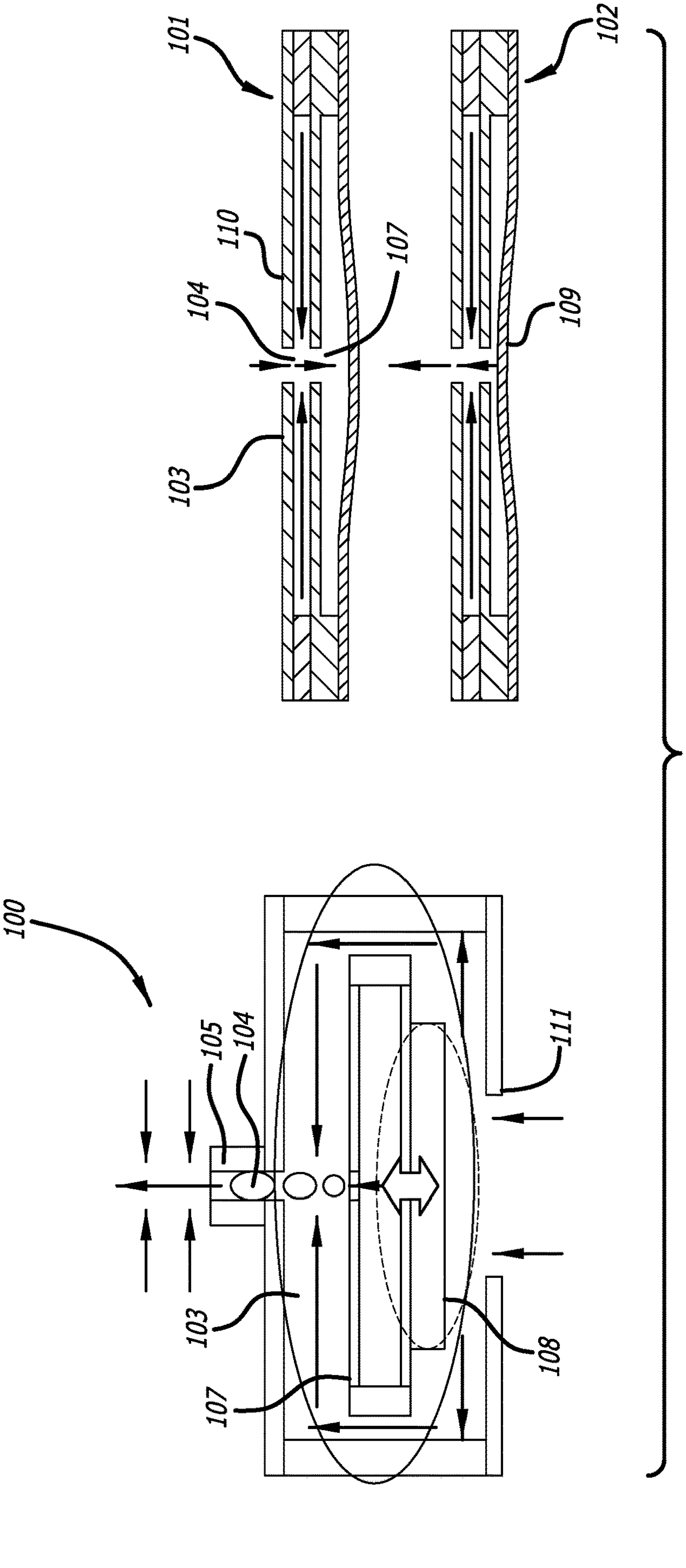
FIG. 1 (which is from Murata's Brochure) illustrates a prior art microblower.
Figure 2:
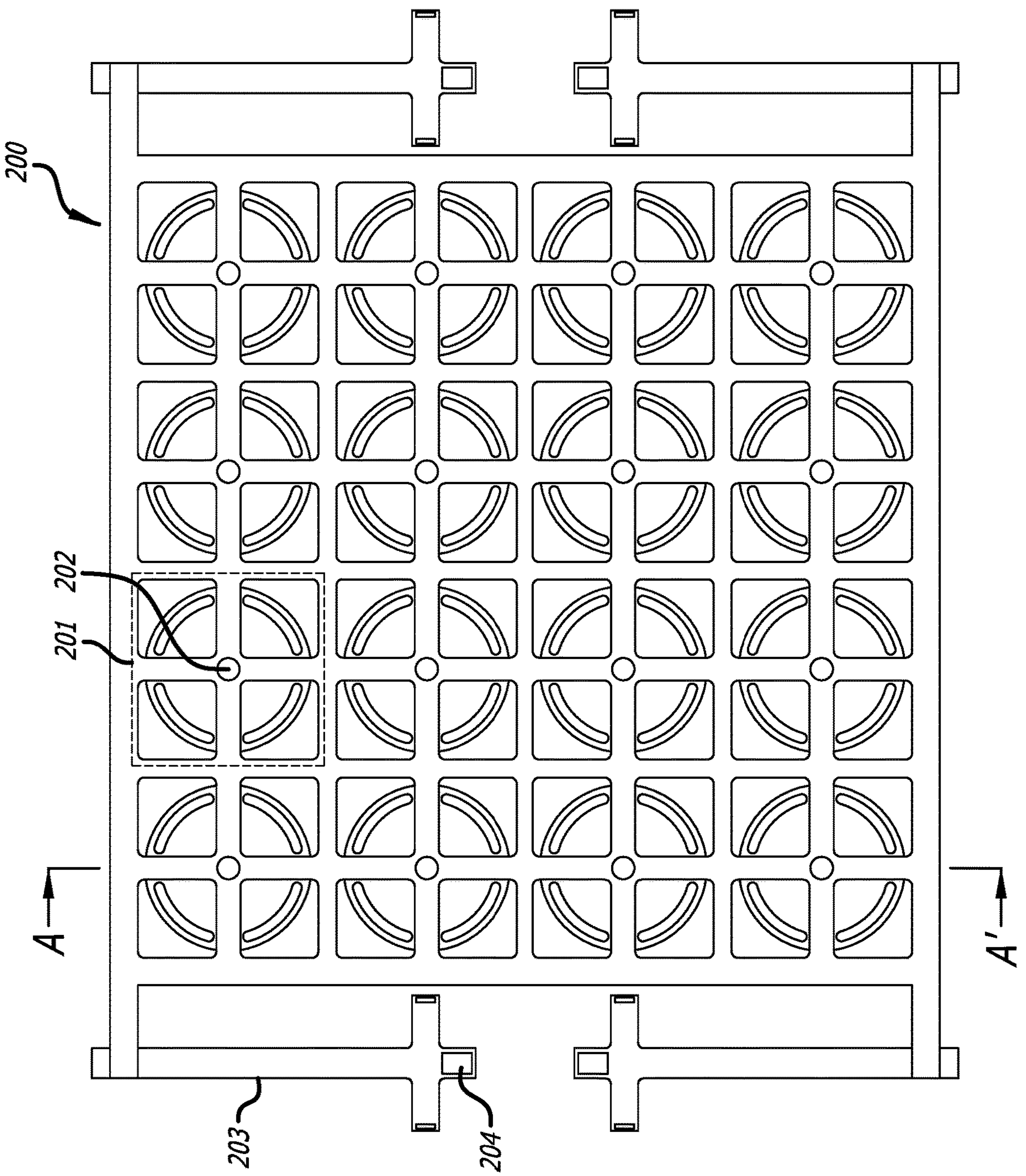
FIG. 2 illustrates a top view of a venturi pump system of the present invention.

FIG. 2 shows a top view of pumping system unit 200 that utilizes sixteen (16) venturi pumps 201 (one of which is outlined by the dashed box) and venturi nozzles 202. The pumping system unit 200 further includes four piezoelectric actuators 204 that are at the end of lever arms 203, which power the venturi pumps 201.

While FIG. 2 shows sixteen (16) venturi pumps powered by four piezoelectric actuators, the pumping system unit can include around 10 to 100 venturi pumps per actuator. Thus, the cost of the piezoelectric actuators of the pumping system of the present invention is more than 10 times lower than existing devices.

Figure 3:
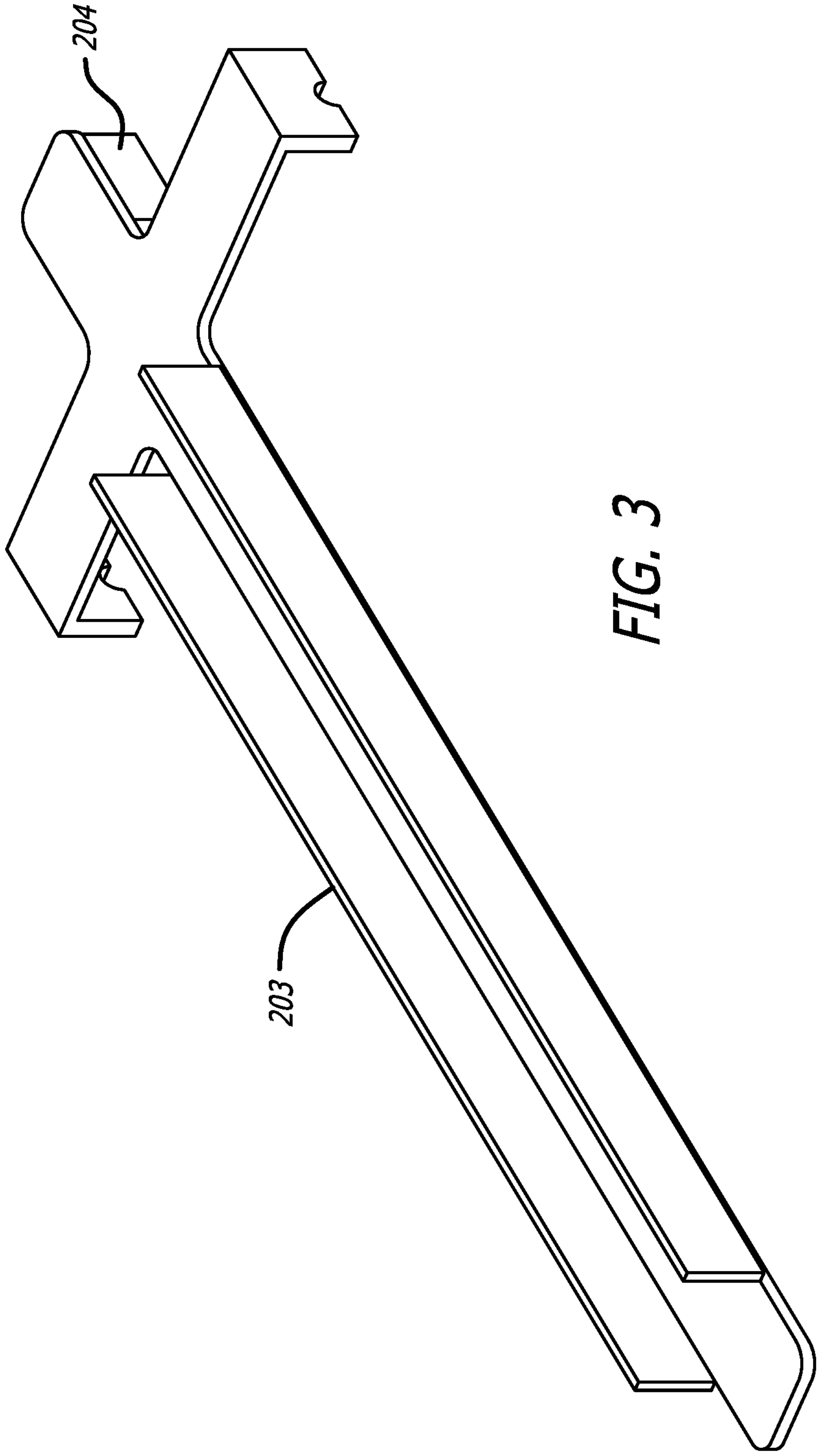
FIG. 3 illustrates a magnified view of the lever arm (with piezoelectric actuator) in the venturi pump system shown in FIG. 2.

Lever arms 203 increase the displacement of the actuator by approximately 10 times. Therefore, for example, a 5 mm long actuator can produce a total displacement of around 50 microns (which is much more than the 5 to 10 microns of existing devices). A waffle-like beam structure that is connected to lever arms 203 (which are shown in detail in FIG. 3) can be made of aluminum, fiberglass, or other strong-light material, and transmits the actuator force/displacement to the moving membrane/diaphragm of each pump 201. Lever arms 203 can be made, for example, from stamped steel.

Figure 4A:
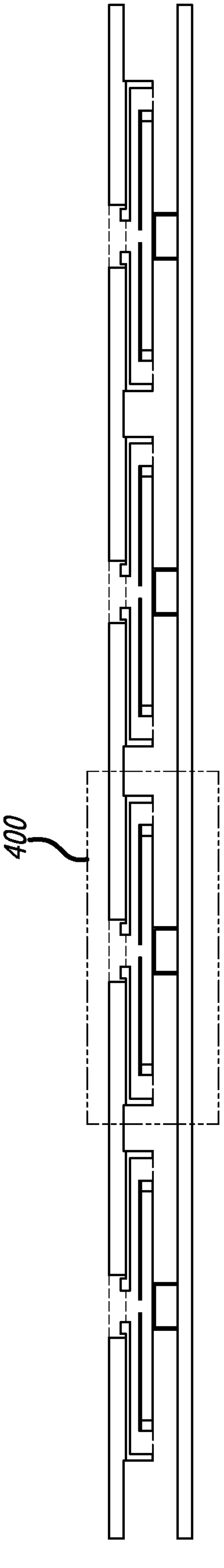
FIG. 4A is an illustration of a cross-section of the venturi pump system shown in FIG. 2.
Figure 4B:
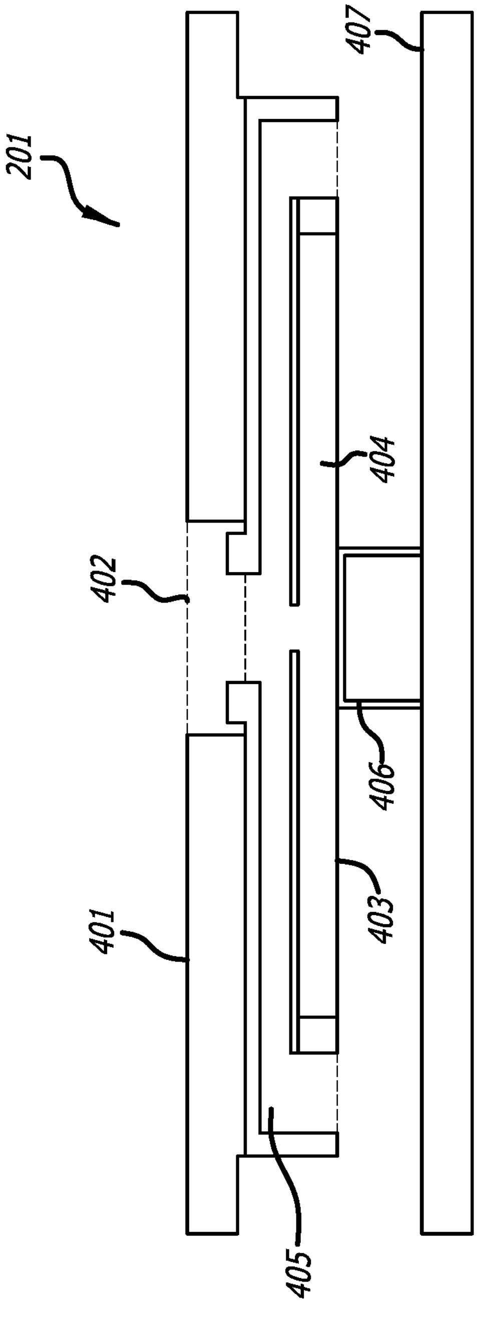
FIG. 4B is a magnified view of one of the venturi pumps shown in FIG. 4A.

FIG. 4A shows four venturi pumps 201 along cross-section A-A' as indicated in the venturi pump system unit 200 shown in FIG. 2. Box 400 indicates one of the of the venturi pumps 201. FIG. 4B is a magnified view of venturi pump 201. Venturi pump 201 includes a top panel 401 having a venturi nozzle 402, a diaphragm (or membrane) 403 that bounds in part pumping chamber 404, and an intake channel 405. There is also a diaphragm displacement rod 406 that is in contact with diaphragm 403 that moves along with diaphragm 403 such that it can change the volume of the pumping chamber 404 during the intake action and the discharge action of the venturi pump 201. The diaphragm displacement object is moved by the movement of beam 407. Beam 407 is moved by the lever arms 203, which again are themselves moved by the four piezoelectric actuators 204.

Figure 4C:
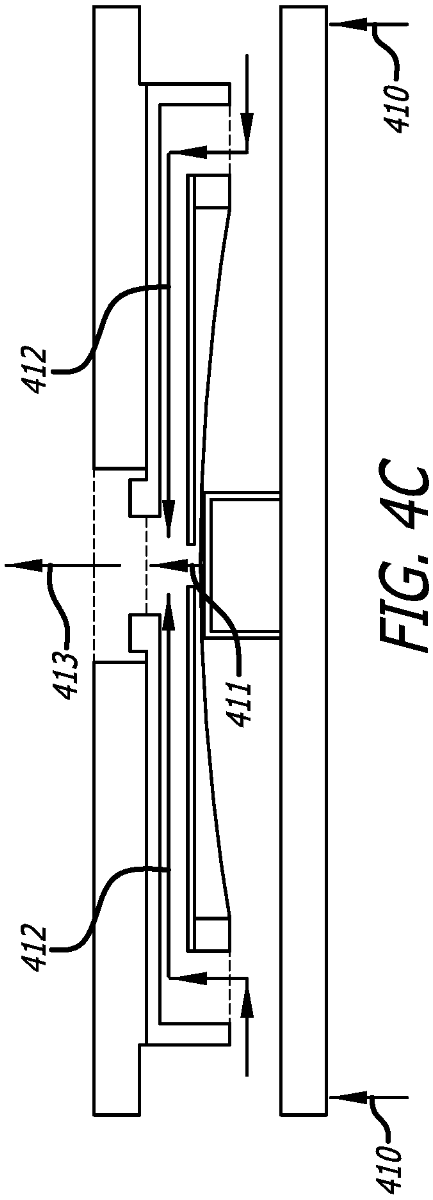
FIG. 4C is an illustration of the fluid flow during the discharge action of the venturi pump shown in FIG. 4B.
Figure 4D:
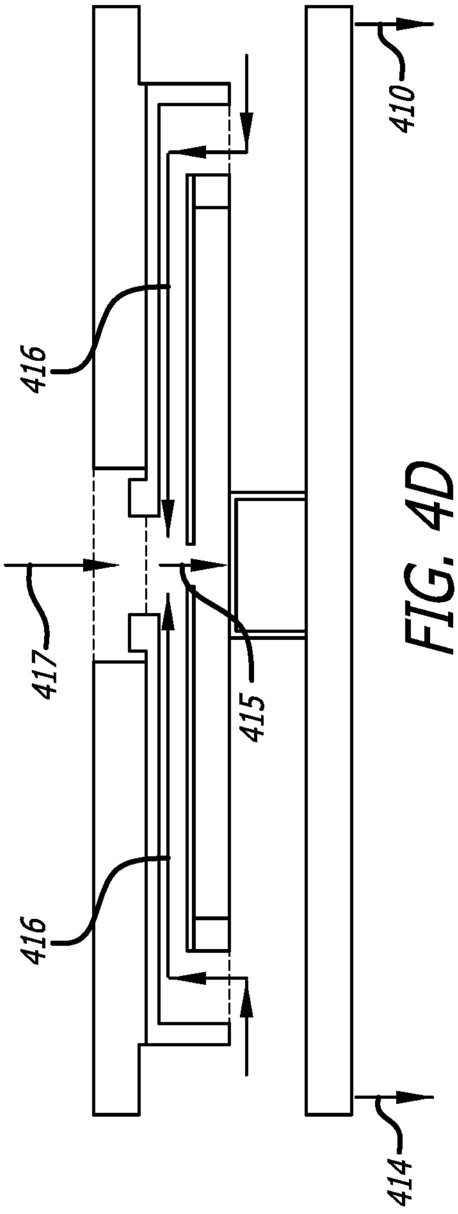
FIG. 4D is an illustration of the fluid flow during the vacuum action of the venturi pump shown in FIG. 4B.

FIGS. 4C-4D show the flow of fluid (such as air) during the discharge and intake actions of venturi pump 201. As shown in FIG. 4C, during the discharge action, the piezoelectric actuators 204 move beam 407 and rod 406 toward diaphragm 403 (which direction of movement is shown by movement arrows 410). This movement of diaphragm displacement rod 406 reduces the volume of pumping chamber 404, which expels fluid (air) as shown by arrow 411. This fluid flow with great velocity generates lower pressure to draw additional fluid (air) from the intake channel 405 as shown by arrows 412. These fluid flows combine to discharge (eject) the gas through the venturi nozzle 402, as shown by arrow 413.

As shown in FIG. 4D, during the intake action, the piezoelectric actuators 204 move beam 407 and diaphragm displacement rod 406 away from diaphragm 403 (which direction of movement is shown by movement arrows 414). This movement of diaphragm displacement rod 406 increases the volume of pumping chamber 404, which draws in (sucks) fluid (air), as shown by arrow 415. This vacuum generates lower pressure to draw fluid (air) from the intake channel 405, as shown by arrow 416, and also through the venturi nozzle 402, as shown by arrow 417.

While the actuation of the venturi pumps has been generally described herein using piezoelectric actuators, other types of actuators, such as magnetic actuators, electrostatic actuators, and other similar actuators can be utilized in the pumping systems of the present invention.

Uses of the Pumping Systems

The pumping system of the present invention can be used to pump air in or out of a sealed chamber to produce sound waves. The pumping system unit in the pumping system can cycle at various frequencies between around 10 kHz to 50 kHz, such as around 20 kHz, and the audio produced by varying the pumping rate at audio frequencies is on the order of 20 to 2000 Hz (bass and midrange notes).

In some embodiments, a speaker will have 2 to 20 separate pumping system units and half of these pumping system units will operate at an pumping frequency that is 180 degrees out of phase with the other pumping system units (so that the net pumping sound/ultrasound produced by the speaker is close to zero). The pumping system can also be used in a similar manner to produce sound using an open baffle in place of a sealed chamber.

Another application is to use a number of separate pumping system units (such as around 2 to 20) to pressurize a sealed disk of an electric drone. The pumping system units can be on the top and bottom of the drone disk and there can be a series of valve-actuated openings on the top, bottom, and periphery of the disk. To increase the altitude of the drone, the valves on the bottom can be opened to allow pressured air to jet toward the ground. To move to the left, the periphery valves on the right can open to allow air to eject out the right side of the pressured disk-shaped chamber.

Unlike a typical drone using one or more propellers, a drone using a set of pumping system units of the present invention will not need to tilt in the direction of motion (which increases drag and slows down the drone) and so can move at higher speeds than existing drones.

Also, a drone using a set of pumping system units of the present invention will emit very little audible noise since its pumps can operate at ultrasonic frequencies. Indeed, the same ultrasound/sound cancellation method discussed above can be utilized to limit any pumping sound and so is ideally suited to deliver goods to residential locations during the day or night.

Furthermore, unlike propeller drones, a drone using a set of pumping system units of the present invention has over 90% of its surface area available for solar cells so that this device can generate energy for itself and possibly transfer some of this energy to stationary or moving electric vehicles.

The upper surface of a drone using a set of pumping system units of the present invention can also be covered with an aluminum coated polymer to reflect the sun as it is used to deliver goods (thus helping to cool the Earth).

A drone using a set of pumping system units of the present invention can also be used as a flying audio speaker.

The Pinkerton '182 Patent describes flying devices and solar energy collection devices that include a graphene-trough pump system. See, e.g., the Pinkerton '182 Patent, col. 17, l. 29-col. 19, l. 49, and FIGS. 26, 27A-27B, 28, 29A-29C, and 30-31. Such teaching and disclosure in the Pinkerton '182 Patent can be implemented in drones using a set of pumping system units of the present invention. As reflected able, such disclosure and teaching of the Pinkerton '182 Patent (as well as its other disclosure and teaching) are incorporated herein in their entirety.

It should also be noted that, as long as the battery and electronics of the drone do not become too heavy (i.e., they stay below a maximum weight threshold), the thrust and thrust-to-weight ratio by the pumping system units in the pumping systems of the present invention is sufficient for the drones utilizing such pumping systems to fly. Maintaining the weight of batteries and electronics below such a threshold for the drone is readily done using today's batteries and electronics.

Moreover, drones using a set of pumping system units of the present invention can be stably flown. It was well known how to use MEMS accelerometers and gyroscopes to control toy electric drones to achieve stable flight. Such technologies are routinely used in toy electric helicopters and drones and other unmanned helicopters and drones. See, e.g., U.S. Pat. No. 9,004,973, entitled "Remote-Control Flying Copter and Method," issued Apr. 14, 2015, to Condon et al. (the "Condon '973 Patent"). Such disclosure and teaching of the Condon '973 Patent (as well as its other disclosure and teaching) are incorporated herein in their entirety.

Figure 5:
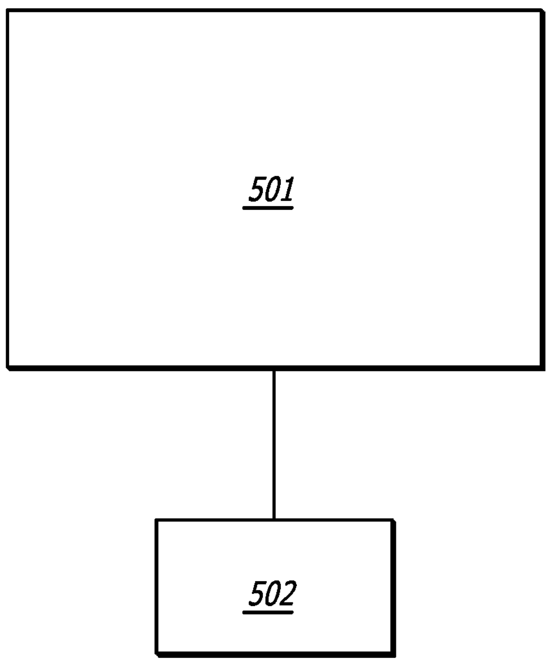
FIG. 5 is a schematic of a device having a venturi pump system of the present invention.

Referring to FIG. 5, the pumping system of the present invention can be utilized in units 502 that are include within or about devices/systems 501. Such systems include (a) energy systems, such as fuel cells (like direct methanol fuel cells), microvalves, and micropumps, (b) air pump applications, such as air fresheners and toys/games, (c) air cooling devices, (such as small/mobile equipment (like micro protectors, security cameras, LED lighting), CPU (like PC notebooks), and piezo fans, and (d) gas sensors, such as reflow checker). Thus the pumping systems can be utilized for air cooling (such as LED cooling and PC cooling) and for air pumps (such as for fuel cells, gas sensors, ionizers, and fragrancers).

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A system, wherein the system comprises a venturi pump system comprising:

(a) a plurality of venturi pumps, wherein, for each venturi pump in the plurality of venturi pumps (i) the venturi pump comprises a membrane and a venturi nozzle, and
(ii) movement of the membrane is operable to flow fluid by the venturi pump in and out of the venturi nozzle;
(b) one or more lever arms that are operable to move the membranes of the venturi pumps in the plurality pumps; and
(c) one or more actuators that are operable to power the venturi pumps in the plurality of venturi pumps by moving the one or more lever arms, wherein
(i) each of the venturi pumps in the plurality of venturi pumps further comprises
(A) a first panel, wherein the first panel comprises the venturi nozzle,
(B) a pumping chamber that is bounded in part by the membrane, and
(C) an intake channel,
(ii) when the membrane is moved in a first direction, fluid flows from the pumping chamber, the fluid combines with fluid that flows from the intake channel, and the combined fluid flows through the venturi nozzle and out the venturi pump, and
(iii) when the membrane is moved in the second direction, fluid flows into the venturi pump through the venturi nozzle, the fluid combines with fluid that flows from the intake channel, and the combined fluid flows into the pumping chamber.

2. The system of claim 1, wherein the one or more actuators are selected from a group consisting of piezoelectric actuators, magnetic actuators, electrostatic actuators, and combinations thereof.

3. The system of claim 1, wherein the one or more actuators are piezoelectric actuators.

4. The system of claim 1, wherein the pumping system comprises between 10 to 100 venturi pumps per actuator.

5. The system of claim 1, wherein
(a) the one or more lever arms each has a first end;
(b) for each of the lever arms, at least one of the one or more actuators is positioned at or near the first end of the lever arm.

6. The system of claim 5, wherein each of the venturi pumps is located at or near a second end of one or more of the lever arms.

7. The system of claim 5, wherein the one or more lever arms displace the membranes of each of the venturi pumps at least 5 times the displacement of the actuators.

8. The system of claim 5, wherein the one or more lever arms displace the membranes of each of the venturi pumps at least 10 times the displacement of the actuators.

9. The system of claim 1, wherein the one or more lever arms are made of a material selected from a group consisting of steel, aluminum, fiberglass, and combinations thereof.

10. The system of claim 1, wherein the fluid is air.

11. The system of claim 1, wherein
(a) each of the venturi pumps in the plurality of venturi pumps further comprises a displacement rod in contact with the respective membrane and is operable to move along the membrane to change the volume of the pumping chamber, and
(b) the displacement rod for each venturi pump is operatively connected to at least one of the one or more lever arms and is operatively moveable by at least one of the one or more lever arms.

12. The system of claim 1, wherein the venturi pump system is operable for pumping at a pumping frequency between 10 kHz and 50 kHz.

13. The system of claim 12, wherein the system comprises two venturi pump systems that operate at a pumping frequency that are 180 degrees out of phase with one another.

14. The system of claim 1, wherein the system is an audio system that can produce sound at an audio frequency in the range of 20 to 2000 Hz.

15. The system of claim 1, wherein the system comprises a plurality of venturi pump systems.

16. A method comprising utilizing a system having a venturi pump system, wherein
(a) the venturi pump system comprises
(i) a plurality of venturi pumps, wherein each of the venturi pumps comprises a membrane and a venturi nozzle,
(ii) one or more lever arms, and
(iii) one or more actuators;
(b) utilizing the system comprises utilizing the one or more actuators to move the one or more lever arms, wherein the movement by the one or more lever arms moves the membranes of the venturi pumps to flow fluid in and out of the venturi nozzles, wherein
(i) each of the venturi pumps in the plurality of venturi pumps further comprise
(A) a first panel, wherein the first panel comprises the venturi nozzle,
(B) a pumping chamber that is bounded in part by the membrane, and
(C) an intake channel,
(ii) utilizing the system comprises utilizing the one or more actuators to move one or more of the lever arms to move the membrane of the venturi pump in a first direction to flow fluid from the pumping chamber, combines the fluid with fluid that flows from the intake channel, and flows the combined fluid through the venturi nozzle and out the venturi pump; and
(iii) utilizing the system comprises utilizing the one or more actuators to move one or more of the lever arms to move the membrane of the venturi pump in a second direction to flow fluid into the venturi pump through the venturi nozzle, combine the fluid with fluid that flows from the intake channel, and flows the combined fluid into the pumping chamber.

17. The method of claim 16 wherein the one or more actuators are selected from a group consisting of piezoelectric actuators, magnetic actuators, electrostatic actuators, and combinations thereof.

18. The method of claim 17, wherein the one or more actuators are piezoelectric actuators.

19. The method of claim 16, wherein the fluid is air.

20. The method of claim 16, wherein each of the venturi pumps is operated at a pumping frequency of 10 kHz and 50 kHz.

21. The method of claim 16, wherein
(a) the system comprises two venturi pump systems; and
(b) the two venturi pump systems are operated at a pumping frequency that are 180 degrees out of phase with one another.

22. A system comprising a venturi pump system, wherein the venturi pump system comprises:
(a) a plurality of venturi pumps, wherein, for each of the venturi pumps in the plurality of venturi pumps
(i) the venturi pump comprises a membrane and a venturi nozzle, and
(ii) movement of the membrane is operable to flow fluid by the venturi pump in and out of the venturi nozzle;

(b) a piezoelectric actuator; and (c) a mechanical structure that connects the piezoelectric actuator to one or more venturi pumps in the plurality of venturi pumps, wherein (i) each of the venturi pumps in the plurality of venturi pumps further comprise (A) a first panel, wherein the first panel comprises the venturi nozzle, (B) a pumping chamber that is bounded in part by the membrane, and (C) an intake channel, (ii) when the membrane is moved in a first direction, fluid flows from the pumping chamber, the fluid combines with fluid that flows from the intake channel, and the combined fluid flows through the venturi nozzle and out the venturi pump, and (iii) when the membrane is moved in the second direction, fluid flows into the venturi pump through the venturi nozzle, the fluid combines with fluid that flows from the intake channel, and the combined fluid flows into the pumping chamber.

23. The system of claim 22, wherein (a) the venturi pump system further comprises one or more additional piezoelectric actuators, (b) for each of the one or more additional piezoelectric actuators, the mechanical structure connects each of the additional piezoelectric actuators to one or more venturi pumps in the plurality of venturi pumps.

24. The system of claim 23, wherein a ratio of (a) the venturi pumps to (b) the piezoelectric actuator and the one or more additional piezoelectric actuators that are connected by the mechanical structure is at least 4 to 1.

25. The system of claim 22, wherein the mechanical structure connects the piezoelectric actuator to at least five venturi pumps in the plurality of venturi pumps.

26. The system of claim 25, wherein the mechanical structure connects the piezoelectric actuator to at least ten venturi pumps in the plurality of venturi pumps.

27. The system of claim 22, wherein the mechanical structure is a grid structure.

28. The system of claim 22, wherein the mechanical structure is a beam structure.

* * * * *